June 15, 1943.  R. STEVENSON  2,321,871
ROTARY SEAL
Filed April 11, 1941
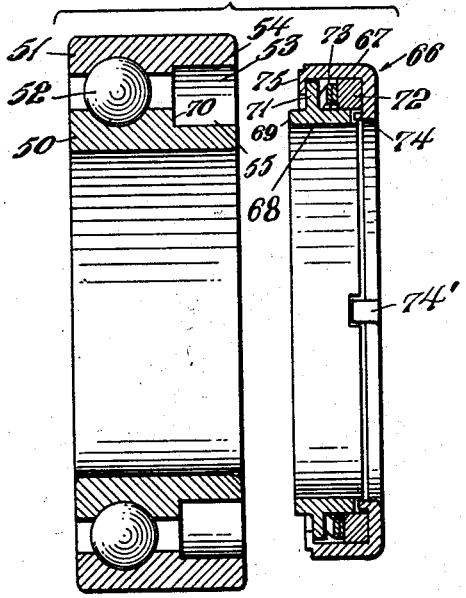
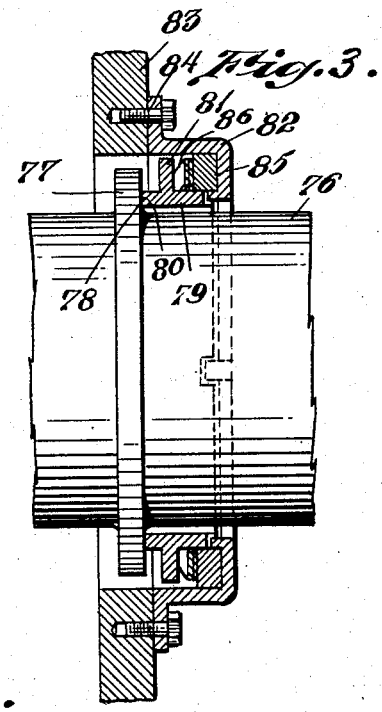
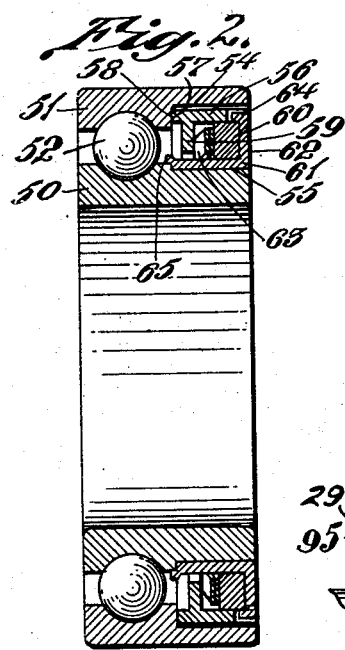
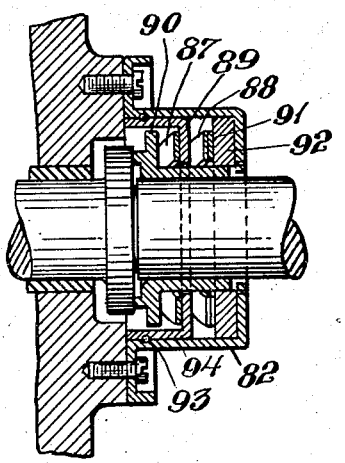
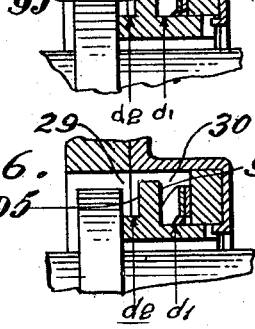
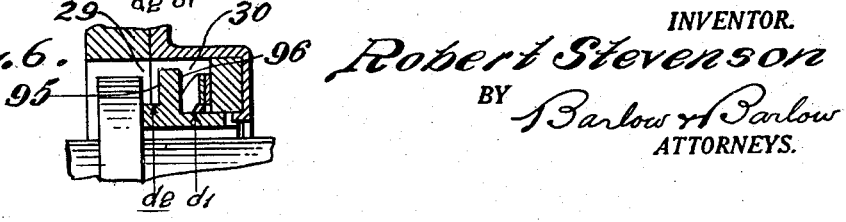
INVENTOR.
Robert Stevenson
BY Barlow & Barlow
ATTORNEYS.

Patented June 15, 1943

2,321,871

UNITED STATES PATENT OFFICE 2,321,871

ROTARY SEAL

Robert Stevenson, Providence, R. I., assignor to Stevenson Engineering Corporation, a corporation of Rhode Island Application April 11, 1941, Serial No. 388,015

1 Claim. (Cl. 286—7)

This invention relates to a seal to prevent leakage from a casing or chamber through the clearance between the casing, or some part fixed thereto, and the shaft which emerges from the casing, or some part rotating therewith, and is particularly adapted for a pump seal, ball bearing seal, or the like.

A shaft which emerges from a casing containing fluid, which may be at a pressure considerably higher than the atmospheric pressure outside, is sealed in various ways, usually either by some sort of soft packing, which requires frequent compression or takeup, or by some sort of an internal construction requiring a specially arranged casing to house the same.

One of the objects of this invention is to provide a seal without the use of soft packing, which seal will prevent leakage from the enclosed chamber through the clearance between the relatively rotating parts.

Another object of the invention is to provide a seal which will utilize the pressure of the liquid to be sealed to press the running parts together to prevent a leak therethrough.

Another and more specific object of the invention is to utilize the pressure of the fluid within the casing itself for controlling the pressure on the sealing surface at a certain ratio of the pressure of the fluid being sealed.

Another object of the invention is to provide a seal which will have a minimum amount of retarding action or friction upon the rotary shaft and thus provide a more efficient operating device.

Another object of the invention is to utilize the seal here provided for a ball bearing so that it may be assembled therewith complete with the ball bearing unit.

Another object of the invention is to provide a seal which may be formed as a unit itself and assembled with a ball bearing or applied itself to a casing from which a shaft emerges.

With these and other objects in view, the invention consists of certain novel features of construction, as will be more fully described and particularly pointed out in the appended claims.

In the accompanying drawing:

Fig. 1 is a sectional exploded view of a use of the invention in a ball bearing with the sealing unit spaced from the recess in which it is located to better illustrate the distinctiveness of the parts;

Fig. 2 is a sectional view of a differently arranged modification of the invention, illustrating a reversal of some of the parts with respect to a ball bearing unit of Fig. 1;

Fig. 3 is a sectional view of a further modification of the invention, illustrating the seal constructed similar to that shown in connection with the ball bearing shown in Fig. 1, but associated with a shaft instead of with a ball bearing;

Fig. 4 is a sectional view of a modified arrangement of the invention with respect to the springs as utilized therein; and Figs. 5 and 6 are sectional views illustrating the area relationships of both the inward and outward controlling fin of the sleeve of the invention.

The seal which is the subject of this invention utilizes a ring or tubular member which, for convenience, I term a sleeve. One end of this member is fashioned to provide the sealing surface and abuts a companion surface at which point the seal is effected; and this end of the member is kept dry from fluid which is to be sealed. The arrangement is such that fluid is kept from engagement with the other end of the member; and I control the member by arranging the fluid in a chamber, one wall of which is the member itself, and then extend a fin or projection from the sleeve member into this chamber, which fin provides areas which I can accurately control by the diameter on either side of the fin so that the pressure of the fluid tends to move the member or sleeve in response to the areas which are presented on either side of this fin, whereby a certain ratio of the sealing pressure to the fluid being sealed will always be maintained. This is in contradistinction to the provision of different pressures, as I utilize the same pressure at all points but provide different areas for the control.

Different forms or arrangements of parts may utilize the above construction; and I have shown several of these different arrangements, all embodying the common principle of pressure control above indicated. Thus, it will be apparent as the description proceeds that I may provide the fin above mentioned as extending radially inwardly from the tubular sleeve or radially outwardly from the tubular sleeve. The structure also may be used directly upon a shaft or in a ball bearing for a shaft, the rotary part of the ball bearing acting essentially the same as a shaft. The sleeve is slidable axially and may rotate with the shaft; or it may be axially slidable, but non-rotatable with reference to the casing.

In Figs. 1 and 2, I have illustrated my seal in conjunction with a ball bearing. The inner raceway member is designated 50, and the outer raceway member, 51. Between these two members there are balls 52. There is an annular recess formed by cutting out portions of both of these raceways, the recess being designated 53 and being an aggregate of portions 54 in the outer raceway and 55 in the inner raceway, together with the space between the raceways. The seal is formed in these figures between the raceways by a unit which may be placed into the recess 53. This unit may differ in detail. In Fig. 2 the unit consists of a sleeve 56 having a sealing face 57 at one end to about the sealing surface 58 on the shoulder formed by the recess 54 in the outer raceway.

A soft packing 60 is retained in a body member or housing 61 shrunk snugly upon the inner raceway 50 and having a flange 62 against which the soft packing 60 may abut. A spring 63 engages a washer to press the soft packing so that it is spread to seal between the inner surface of the sleeve 56 and the housing and prevent fluid from escaping, although the sleeve may be permitted some axial movement. The packing 60 may be a resilient compressible material such as "neoprene" which may act with the springs to urge the sleeve axially. A fin 59 extends radially inwardly from the sleeve 56 into the fluid chamber formed within the sleeve 56 and is exposed to the fluid on its opposite sides. The spring is of the annular distorted ring type and engages the fin 59 so as to force the sleeve towards the sealing position.

The fluid which is in the casing may pass outwardly through the clearance between the casing and shaft or through the balls and into the chamber between the sleeve and the body member and is divided by the radially extending fin portion into a portion 29 on one side and a portion 30 formed on the other side so as to exert its pressure upon the areas 95 and 96; and by so arranging the diameter of the chamber portion 29 and the chamber portion 30, I may cause this pressure to move the radial fin in accordance with the differential of these areas. Thus, if I provide a larger area at 96 than at 95, as seen clearly in Fig. 6, the pressure will force the sleeve toward the casing and cause pressure to be transmitted to the sealing surfaces 69 and 70; while, if I make these areas equal as shown in Fig. 5, regardless of the pressure of the fluid to be sealed within the casing and in the chamber, its influence will not be exerted on the seal, and the springs alone will maintain the seal. The housing is retained over the soft packing 60 by the upward extension as at 65 to assist in retaining the sleeve in assembly with the seal as a unit, while a flange 64 assists in housing the packing 60.

In some instances, it may be desirable to extend the fin outwardly from the sleeve instead of inwardly, the arrangement being exceedingly simple in connection with a ball bearing unit; and in Fig. 1, I have illustrated a sealing unit, designated generally 66, which in the form there shown is a complete unit which may be forced into the recess 53 of the ball bearing unit and become an assembly therewith, as shown in Fig. 2, except that the casing 67 will have a snug fit with the outer raceway 51 and be tight therewith. This sealing unit in Fig. 1 thus will remain stationary with the outside raceway 51 and will seal against the inner raceway 50. The unit 66 consists of a housing or body member 67 which contains the sealing sleeve 68 having a sealing face 69 to engage the sealing face 70 of the recess portion 55 of the inner raceway 50. A fin 71 on the sleeve 68 extends radially outwardly, and its opposite surfaces are exposed to the fluid which passes through the ball space and enters the housing 67. The outside diameters of the sleeve on either side of the fin determine the effective area exposed to the fluid. A soft packing 72 is contained within the housing and engages the sleeve 68. A spring 73 acts between the fin 71 and the soft packing to force the sleeve toward the seal and also to spread the packing by its action through the washer so that the sleeve will be sealed against leakage of fluid and yet may move axially. The housing has portion 75 to retain the parts in assembled relation. A flange 74 assists in housing the soft packing and is provided with a finger 74' to enter a recess in the sleeve and prevents rotation thereof.

In Fig. 3, I have illustrated an assembly similar to the assembly shown in Fig. 1, except that a ball bearing is not illustrated and the seal is effected directly against a portion carried by a shaft 76, such as a flange 77 thereon providing a sealing face 78. In this case the sleeve 79 also is provided with a sealing face 80, while the radially extending fin 81 projects outwardly. A housing 82 is bolted securely to the casing 83 as at 84 and contains a soft packing 85 which is spread by the spring 86 acting between the fin 81 and a washer providing an abutting face for the soft packing, thus serving to seal the sleeve in the casing.

In Fig. 4, I have illustrated a structure similar to that of Fig. 3, except that I have used two springs, 87 and 88, each acting between the common abutment 89, with the spring 87 acting against the fin 90 and the spring 88 acting through the washer 91 on soft packing 92. The abutment 89 is locked to the casing 82 by means of a split ring 93 which is snapped into place between half-round recesses in the casing 82 and the annular portion 94 of the abutment 89.

The outwardly extending fin as shown in Figs. 1 and 3 at 71 and 81 is shown in Figs. 5 and 6 as providing different areas on its opposite sides 95 and 96. In Fig. 5, these areas are equal, while in Fig. 6, the area of side 96 is clearly greater than the area 95.

In the figures the diameter on the side of the seal away from the fin is denoted $d_1$ and on the side of the fin near the seal, $d_2$. The differential of pressure may be denoted $d_2-d_1$. In Fig. 5, this will be zero, while in Figs. 12 and 14, some pressure will be present to force the fin toward the seal.

By the above arrangement, a very definite ratio between the fluid pressure and the pressure on the seal may be maintained to keep the sealing surfaces dry at all times.

The flexible or soft packing 72 or 92 enables some slight adjustment to be made of the sleeve so that the alignment of its annular sealing surface may be had with the sealing surface to be engaged. By turning these surfaces down very carefully with a tool which will avoid tearing of the seat and possible contamination, these surfaces have been made to mate so that they may be put into service without requiring running in; and relatively high pressures have been successfully sealed under conditions where the proportion is such as to require an urge of the sleeve toward the sealing surface by the pressure.

I claim:

An independent sealing unit for sealing against a part presenting an annular sealing surface comprising a concentrically arranged body member and sleeve, said sleeve being axially slidably mounted with reference to said body member, said unit providing a chamber therein partially bounded by said body member and sleeve to receive fluid, said sleeve having a sealing surface at one end for engagement with said annular surface, means located between and engaging said body and sleeve to prevent the fluid having access to the opposite end of the sleeve, said sleeve having at a location intermediate its ends a portion extending toward the body member and exposed to the fluid to be sealed to present an area on the side away from the seal and an area on the side near the seal whereby the pressure of the fluid to be sealed will press upon the said extending portion in directions dependent upon the respective diameters exposed to fluid pressure on the different sides of the said extending portion, and a flange on said body extending to a position to engage said extending portion of said sleeve to prevent the separation of said sleeve and body prior to operative positioning, resilient means acting on said extending portion to urge the same toward said flange, the sealing face of said sleeve being located a distance from said extending portion so that said sealing face projects beyond said flange whereby the extending portion of said sleeve is moved away from said flange when the unit is in operating position.

ROBERT STEVENSON.